No. 628,861. Patented July 11, 1899.
T. SHIPLEY.
HOISTING APPARATUS.
(Application filed Apr. 20, 1899.)
(No Model.) 3 Sheets—Sheet 3.
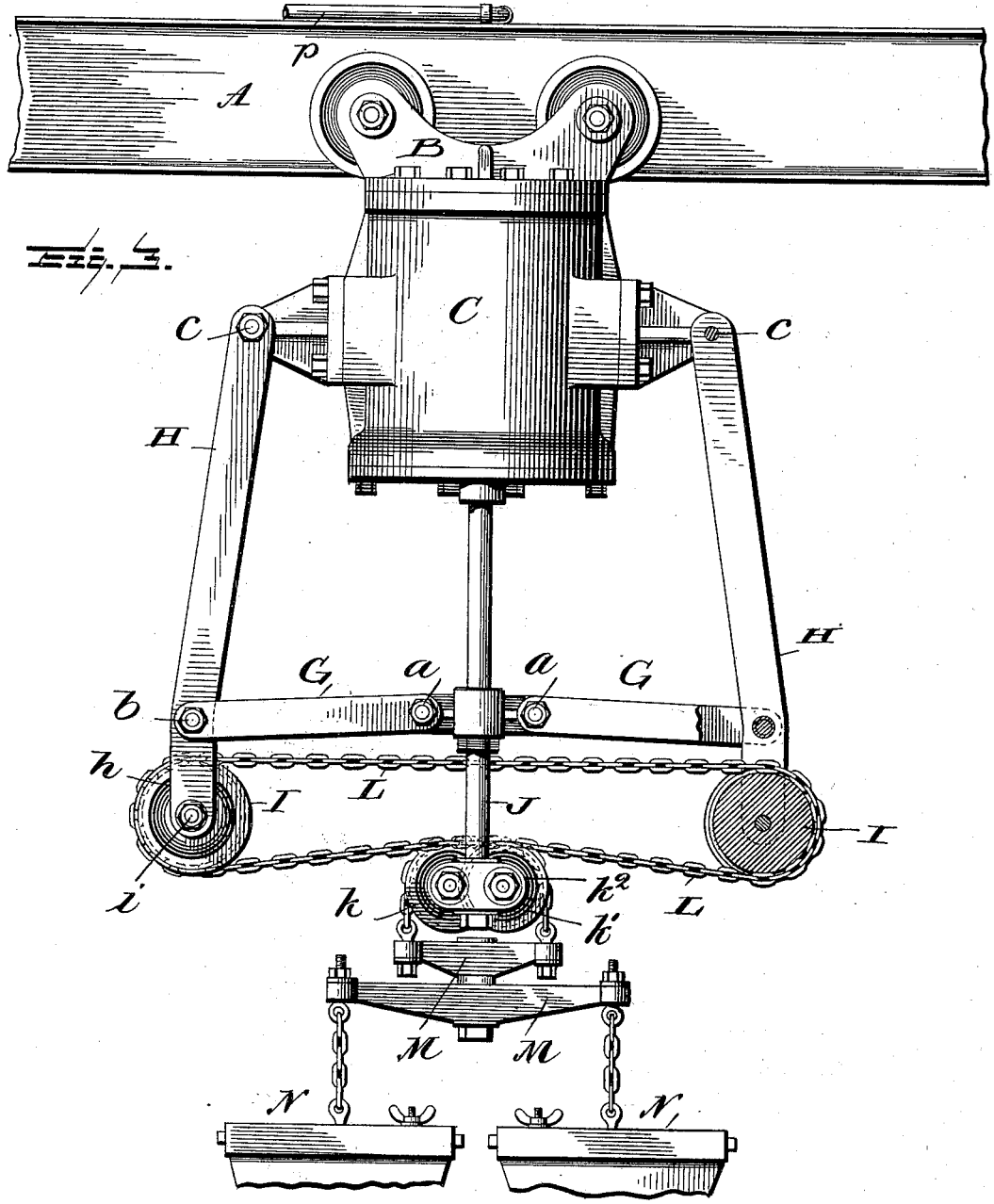
Witnesses
L. C. Hills.
E. Willasick
Inventor:
Thomas Shipley
By Marcellus Bailey
his Attorney
THE NORRIS PETERS CO., PHOTO-LITHO., WASHINGTON, D. C.

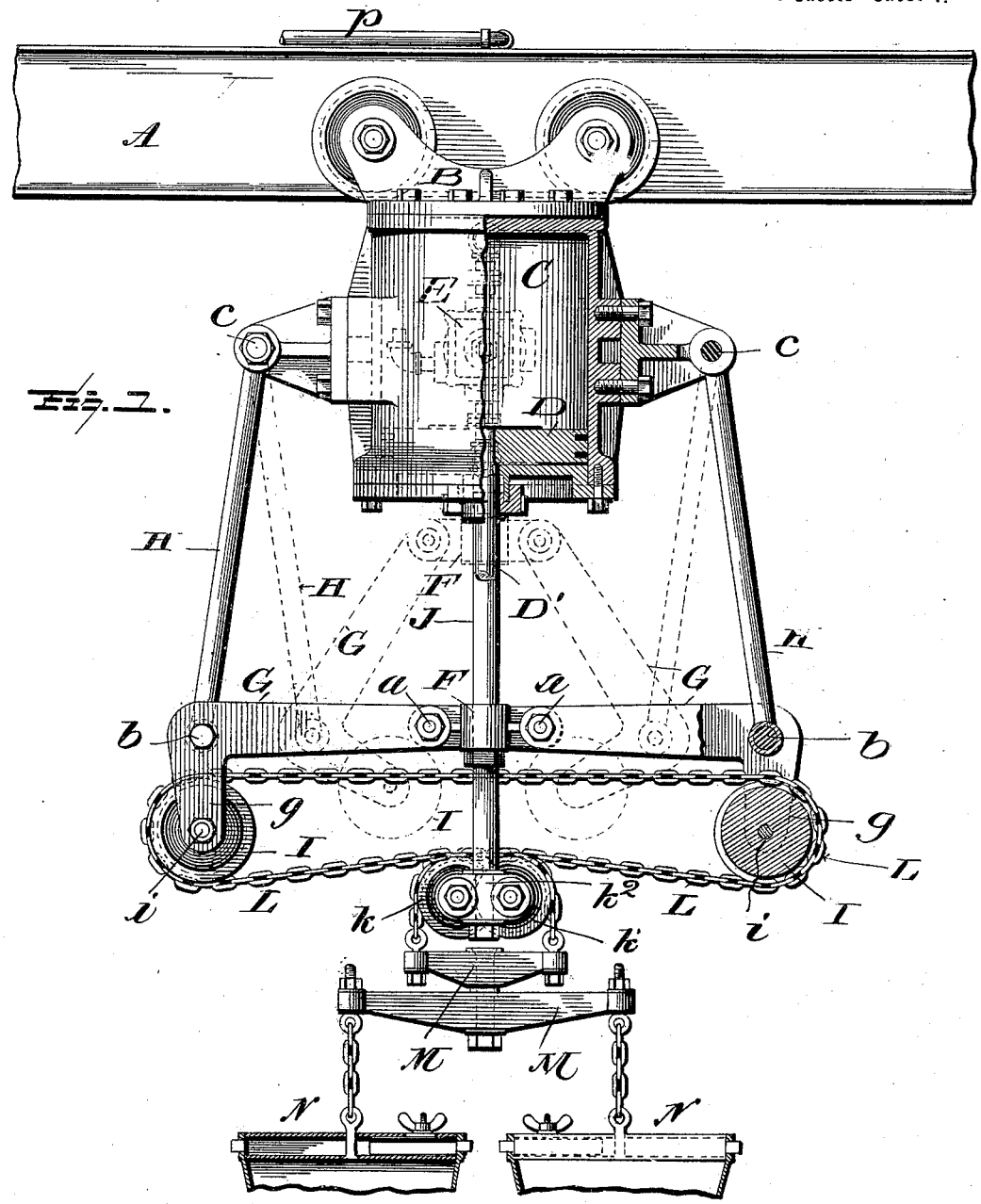

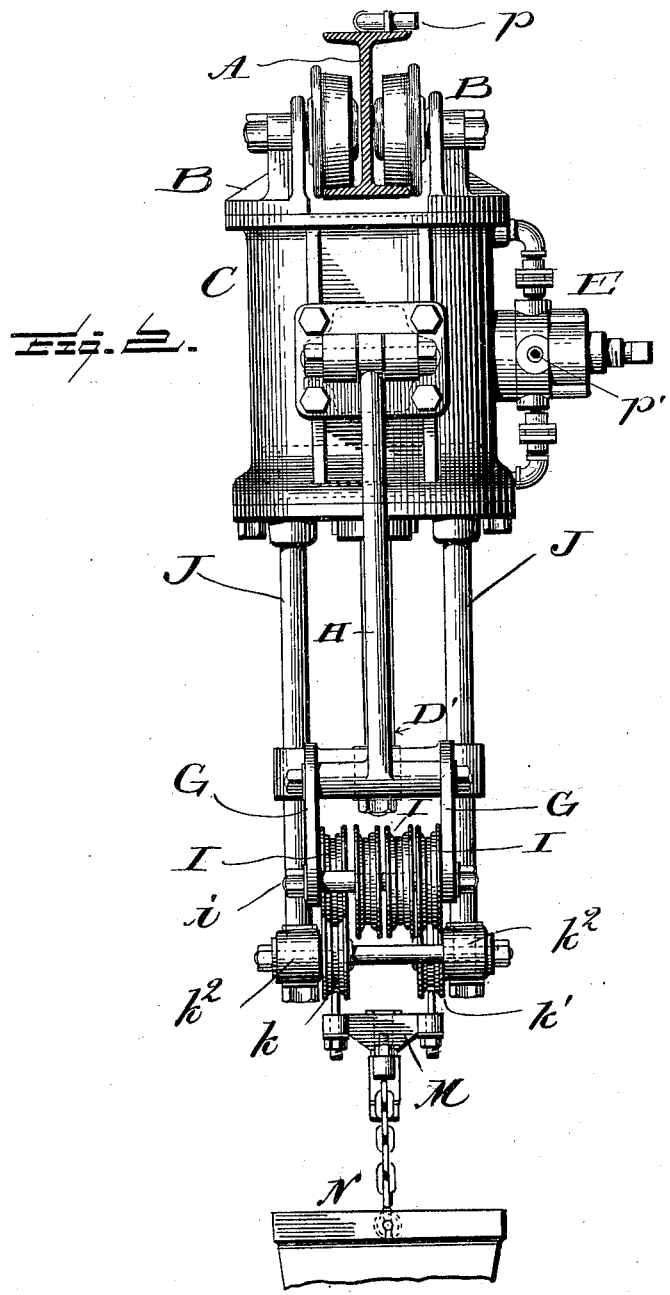

UNITED STATES PATENT OFFICE.

THOMAS SHIPLEY, OF YORK, PENNSYLVANIA.

HOISTING APPARATUS.

SPECIFICATION forming part of Letters Patent No. 628,861, dated July 11, 1899.

Application filed April 20, 1899. Serial No. 713,733. (No model.)

*To all whom it may concern:*

Be it known that I, THOMAS SHIPLEY, of York, in the county of York and State of Pennsylvania, have invented certain new and useful Improvements in Hoisting Apparatus, of which the following is a specification.

The invention, while it relates to a hoisting apparatus for any purpose, yet has been designed with more particular reference to hoisting ice-cans out of the freezing-tanks of ice and refrigerating machinery.

The main objects I have in view in the invention are to shorten or decrease the height of the apparatus, while retaining the desired range of lift; to so arrange things that the power applied to lift the cans will increase as they are raised out of the brine in which they are immersed, and consequently become heavier and heavier to lift, and to provide an apparatus which is simple, durable, and not liable to easily get out of order.

The motive power of the apparatus is furnished by air, water, or steam admitted to a cylinder containing a piston which is moved up and down in the cylinder, according as the motor fluid is admitted below or above it, and which is provided with a piston-rod that moves with it and projects down from the cylinder. To the piston-rod is attached a cross-head, to opposite sides of which are pivoted toggle arms or levers which extend outwardly in opposite directions from the cross-head and at or near their exterior opposite ends are pivoted to pendulous arms, which at their upper ends are in turn pivoted to the frame of the apparatus. Intermediate of this system of pivoted arms or levers is a guide or leader which is attached to the frame or other suitable part of the apparatus, and over supports, such as sheave-wheels or the like, carried by the said system of pivoted arms or levers run one or more chains or cables or like flexible connections, which thence pass to the guide or leader, which is also preferably provided with sheave-wheels, and thence down to a cross-head, to which the weight to be lifted is attached. It is in this combination of pivoted levers, the guide or leader, and the flexible connection that my invention is comprised.

To enable others skilled in the art to understand and use my invention, I will now proceed to set forth more particularly the manner in which the same is or may be carried into effect by reference to the accompanying drawings, in which—

Figure 1 is a side elevation, partly in section, of so much of a hoisting apparatus as needed for the purpose of illustrating and explaining my invention. Fig. 2 is a like elevation of the same in a plane at right angles to the plane of elevation in Fig. 1, omitting the chain L. Fig. 3 is a side elevation of a modified form of apparatus.

Referring now to Figs. 1 and 2, the apparatus is supposed to form part of a crane mechanism, of which A is the crane-beam, on which runs the trolley-frame B, that carries the parts of the apparatus in which my invention is comprised. The trolley-frame is supported on the gudgeons or axles of its trolley-wheels, hangs below the crane-beam, as seen in Fig. 2, and carries the cylinder C, said cylinder containing the piston D and being furnished with a four-way-valve device E, to which the compressed air or other suitable motor fluid is supplied from a pipe $p$ on the crane-beam, which pipe by a hose of suitable length (not shown) is connected to the inlet-pipe $p$ of the four-way-valve device E. By means of this valve device the motor fluid through suitable passages is admitted into the cylinder either above or below the piston D, as desired and as will be understood without further explanation. Thus far there is nothing essentially new in the apparatus.

The piston-rod D' passes out through a suitable stuffing-box in the lower head of the cylinder C, and to its lower end is secured a cross-head F, to which are pivoted at $a$ the inner ends of toggle-levers G, which project laterally in diametrically opposite directions from the cross-head and at or near their outer ends are pivoted or jointed at $b$ to the lower ends of connecting-levers H, which at their upper ends are jointed at $c$ to brackets suitably secured to the trolley-frame or the cylinder. The toggle-levers in the present instance have the form of elbow-levers, the joint $b$ between each toggle-lever and its connecting-lever H being at the elbow of the toggle-lever and the outer and shorter arm $g$ of each toggle-lever being provided with one or more sheave-wheels I, pivoted therein, as shown. There are three of these wheels I for each lever, and they are mounted to revolve upon a cross pin or axle $i$, which extends across between the two elbow-bars of which each lever G is composed, as indicated in Fig. 2.

Attached to suitable supports J, fixed to the trolley-frame or other suitable part of the apparatus, is a guide or leader composed in this instance of two sheave-wheels $k\ k'$, mounted in a bracket-frame $k^2$, secured to the supports J.

To a cross-head M is attached one end of a rope, cable, or chain L, which thence passes over one of the guide-sheaves $k$, thence to and around the sheave-wheels I, carried by the toggle-levers, passing around one of the wheels on one of the levers, thence across to the corresponding sheave-wheels on the other lever, and so on, and thence to the other guide-sheave $k'$, down over which it passes to the cross-head M, to which its outer end is secured.

The weight to be lifted is attached to the cross-head M, said weight consisting in the present instance of two ice-cans, the tops or upper parts of which are shown at N.

The parts are shown in full lines in the position they occupy when the cans are lifted, the piston D being at the bottom of its cylinder and the toggle-levers G being spread apart to the full extent.

In order to lower the cans, the motor fluid is admitted below the piston D and is exhausted from above the same. The upward stroke or movement of the piston brings the system of levers G H to the position shown in dotted lines in Fig. 1. The opposite sets of sheave-wheels I are thus caused to approach one another, consequently giving slack to the chain which is stretched between them, the chain running down through the guide or leader K and lowering the cans or other weight suspended from it. A reverse movement of the piston D will spread the sheave-wheels I apart, and consequently will lift the cans.

When the hoisting apparatus begins to lift, the toggle is at its point of least power; but at this time—in the ice machinery for which it has been more particularly designed—there is very little weight to raise, inasmuch as the cans actually float in the brine which fills the freezing-tank, in which they are immersed. As the cans are gradually raised out of the brine, and the weight consequently comes heavier and heavier on the hoist, the toggle leverage correspondingly increases and more power is given to the apparatus, the speed or rate of lift of course lessening as the power increases, and vice versa.

The range or extent of lift movement can be varied by varying the number of leads or turns the chain makes around the sheaves I, there being in the present instance three leads, by which is intended the lengths of chain stretched between the two sets of levers on opposite sides of the cylinder. There may be more or less than three sheaves I in each set. In this way with a short cylinder C and a compact form of apparatus I am enabled to obtain a very extended range of lift movement. The apparatus, moreover, is free from complication, durable, and not liable to get out of order.

The apparatus shown in Fig. 3 is like that shown in Figs. 1 and 2, save that the toggle-levers G are not formed as elbow-levers and the sheave-wheels I are mounted in extensions $h$ of the connecting-levers H below the pivots $b$. This, however, is a structural modification which does not change materially the general principle and mode of operation of the system, the short extensions $h$ in Fig. 3 serving measurably the same purpose as the short arms $g$ in Fig. 1.

Having described my improvements and the best way now known to me of carrying the same into effect, I desire it to be understood in conclusion that I do not restrict myself to the precise structural details hereinbefore described, since manifestly the construction and arrangement of the parts of the apparatus may be modified in various ways without departure from my invention; but

What I claim as new, and desire to secure by Letters Patent, is—

1. The combination of the motor-cylinder and its piston and piston-rod, the toggle-levers jointed to the piston-rod, the connecting-levers jointed at one end to the frame and at the other end to the outer ends of the toggle-levers, the two sets of sheave-wheels carried by and moving with said system of levers, the guide or leader, and the chain extending around and across between the two sets of sheave-wheels and thence to the guide or leader, substantially as and for the purposes hereinbefore set forth.

2. In combination with the motor-cylinder and its piston and piston-rod, the system of levers operated thereby, the two sets of sheaves carried by and moving with said system of levers, the leader or guide, and the chain extending in several folds around and across between the two sets of sheave-wheels and thence to the guide or leader, the system of levers being arranged for operation substantially as hereinbefore set forth, whereby the lifting power of the system increases progressively as said system approaches the limit of its lifting movement.

3. In combination, the motor-cylinder and its piston and piston-rod; the connecting-levers H jointed at their upper ends to the cylinder or the frame carrying said cylinder; the toggle-levers G formed as elbow-levers and jointed at their inner ends to a cross-head on the piston-rod and at their elbows to the lower ends of levers H; the sheaves I mounted in the outer and shorter arms of the elbow-levers G; the leader K; and the chain or cable L—these parts being arranged together for joint operation substantially in the manner and for the purposes hereinbefore set forth.

In testimony whereof I have hereunto set my hand this 13th day of April, 1899.

THOS. SHIPLEY.

Witnesses:
A. B. STRICKLER,
HENRY R. KRABER.